United States Patent [19]
Kabasawa et al.

[11] Patent Number: 4,715,004
[45] Date of Patent: Dec. 22, 1987

[54] PATTERN RECOGNITION SYSTEM

[75] Inventors: Satoshi Kabasawa, Osaka, Japan; Ming-Shiun Hsieh; Shih-Ming Chang, both of Taipei, Taiwan; Chun-Hong Lin, Tainan, Taiwan

[73] Assignee: Matsushita Electric Industrial Co., Ltd., Kadoma, Japan

[21] Appl. No.: 611,734

[22] Filed: May 18, 1984

[30] Foreign Application Priority Data

May 23, 1983 [JP] Japan ................... 58-91122

[51] Int. Cl.$^4$ ............................. G10L 5/00
[52] U.S. Cl. ..................... 364/513.5; 381/43
[58] Field of Search ...................... 381/41–43; 364/513, 513.5

[56] References Cited

U.S. PATENT DOCUMENTS 4,516,215  5/1985  Hakaridani et al. ............ 364/513.5
4,559,604  12/1985  Ichikawa et al. ............... 364/513.5

OTHER PUBLICATIONS

A Walsh–Hadamard Transform LSI for Speech Recognition—Ohga et al., pp. 263-270–IEEE Transactions on Consumer Electronics, Aug. 1982.

Primary Examiner—E. S. Matt Kemeny
Attorney, Agent, or Firm—Cushman, Darby & Cushman

[57] ABSTRACT

In speech recognition, an unknown input signal is analyzed for its feature pattern sequence $A_i$ which is compared to prestored reference patterns grouped in categories. Each category m has a representative reference pattern $B^m$ which represents the average value of the n patterns in the catagory $B_n^m$. A first comparison (pre-matching) to the representative patterns is followed by a second matching to the actual reference patterns in the most likely category. The representative pattern is used in pre-matching and matching, thereby simplifying calculation and increasing accuracy.

5 Claims, 9 Drawing Figures

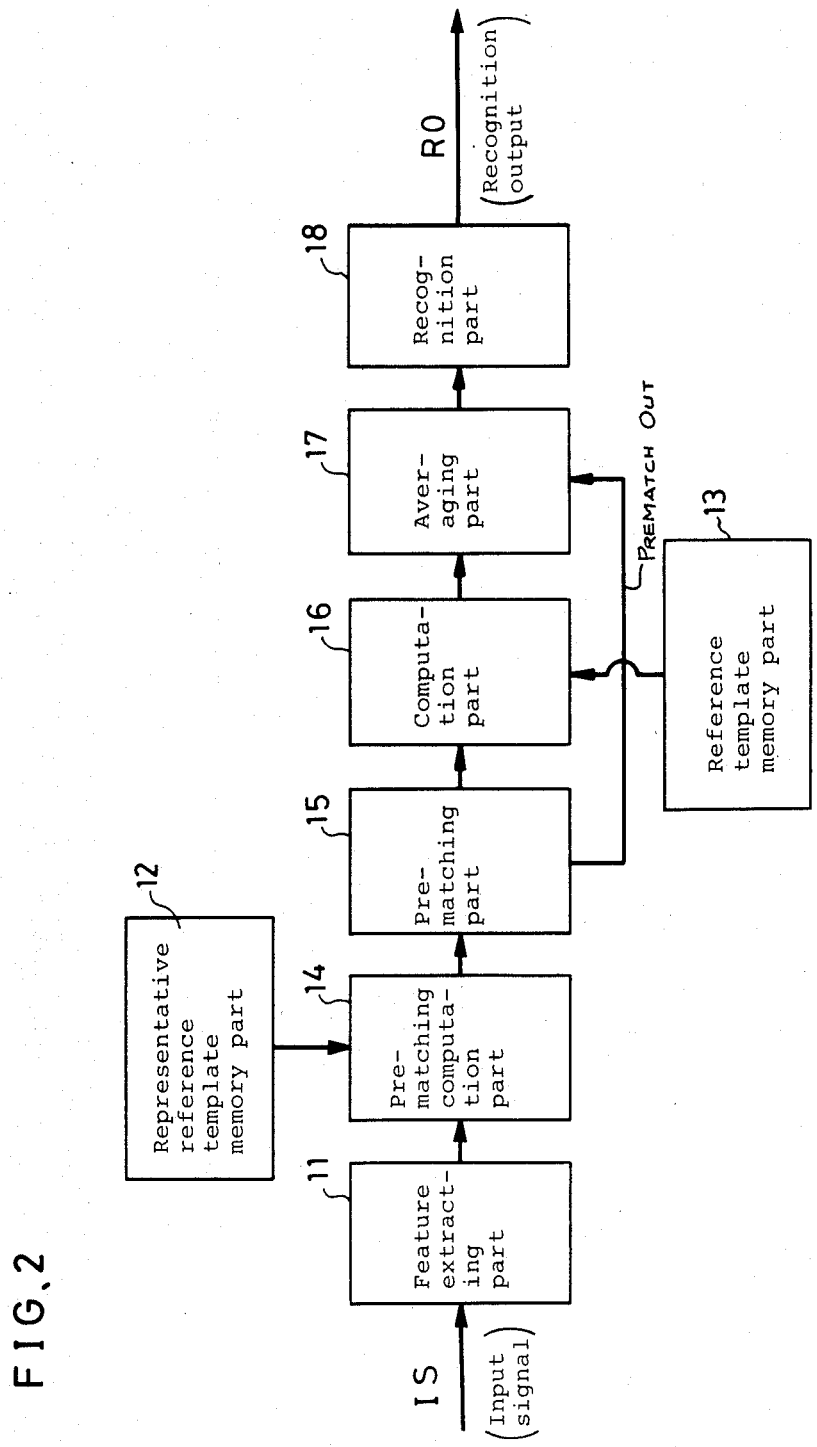

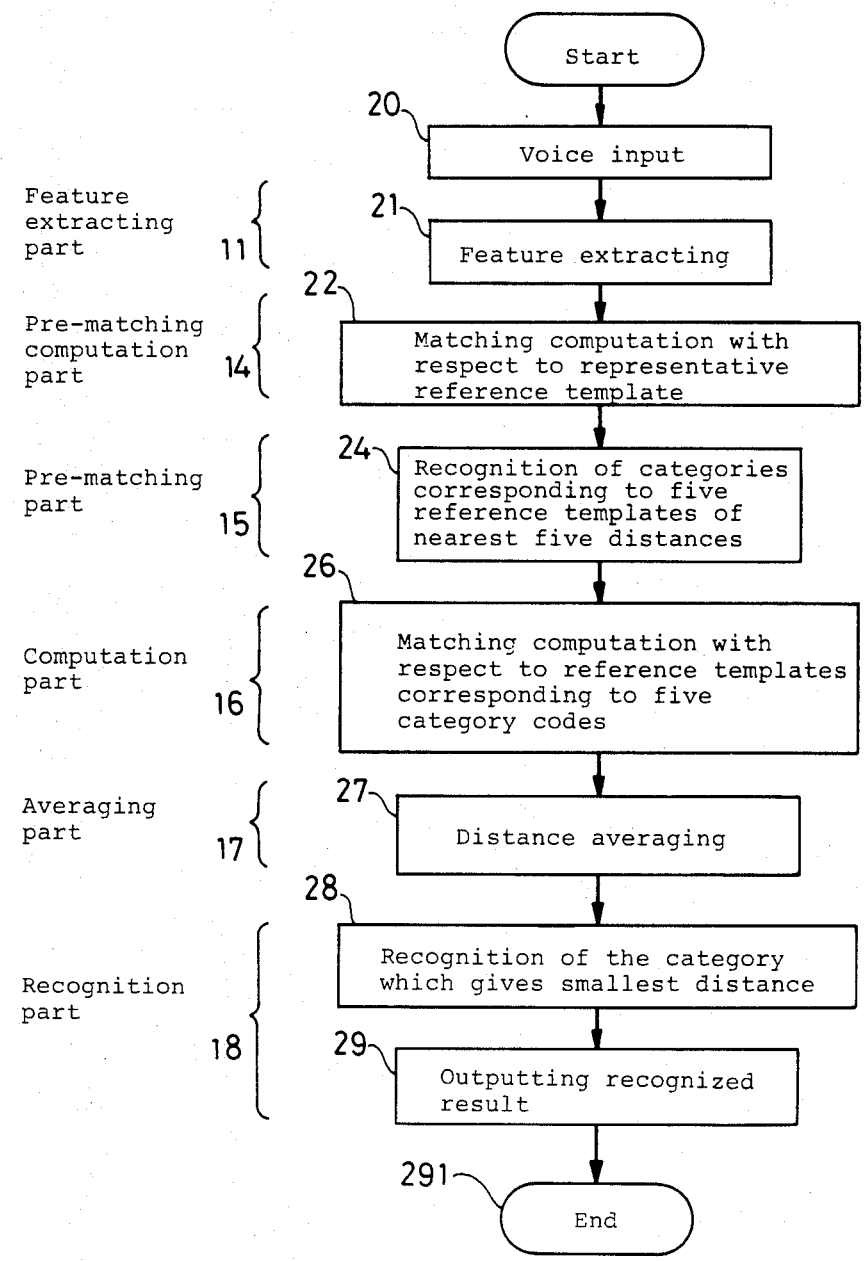

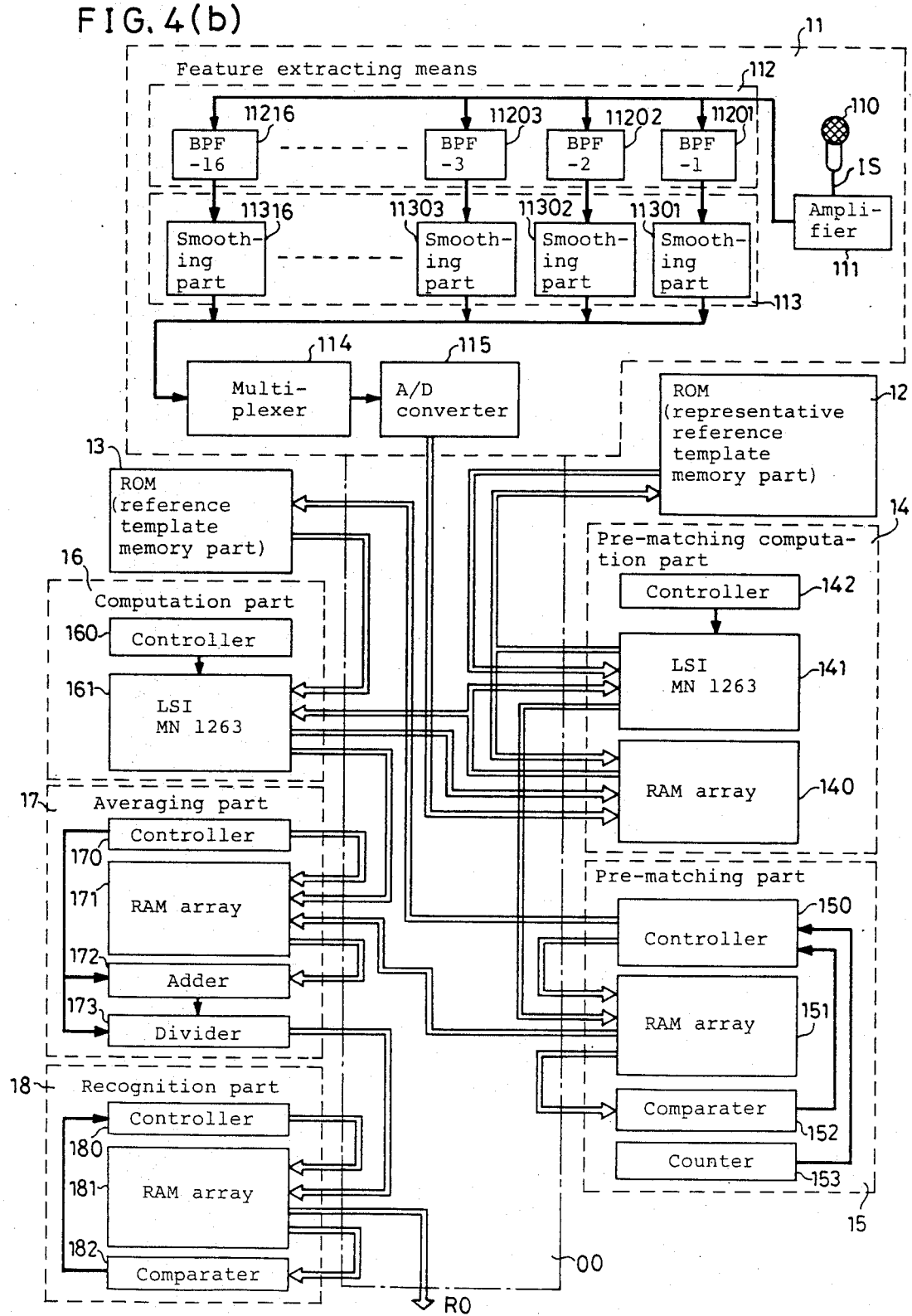

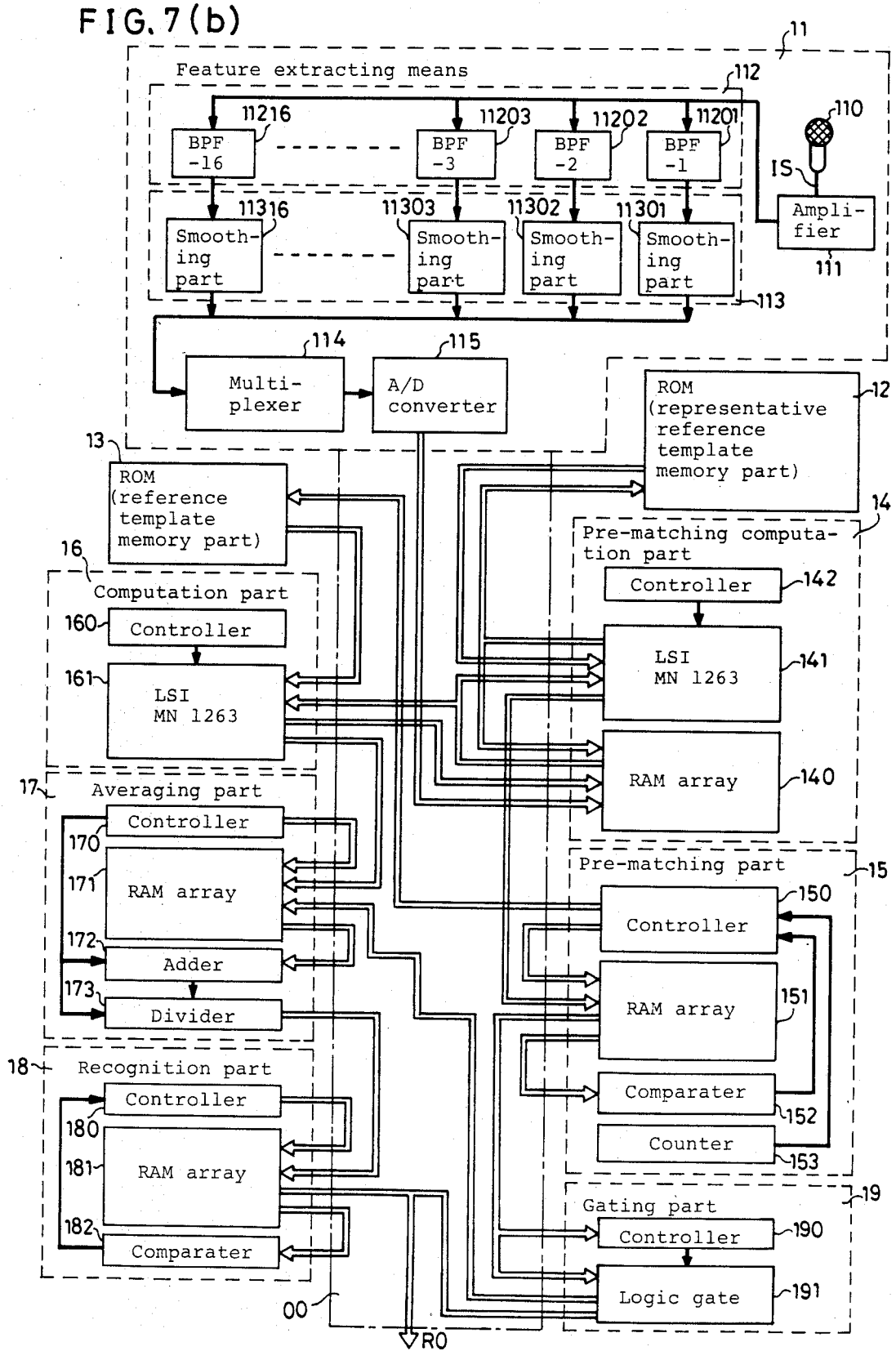

PATTERN RECOGNITION SYSTEM

BACKGROUND OF THE INVENTION

1. Field of the Invention

The present invention relates generally to a pattern recognition system for use, for instance, in a voice recognition system, and more particularly to a pattern recognition system which issues a category code corresponding to the nearest reference template to a characteristic pattern obtained from input signal.

2. Description of the Prior Art

In recent years, development of a pattern recognition system for the purpose of a human-machine system input means has been vigorously pursued. For instance, by recognizing a pattern of a human voice which is a source of most natural information generation, great developments are expected in input means of human-machine system, and hitherto various proposals have been made.

Hereafter, a conventional voice pattern recognition system is described with reference to FIG. 1 which is a block diagram of a configuration of a conventional system. The conventional voice pattern recognition system comprises a feature extracting part 1, a reference template memory part 2, a computation part 3, an averaging part 4 and a recognition part 5.

The conventional voice pattern recognition system configured as shown in FIG. 1 operates as follows: Input signal IS given to the feature extracting part 1 is converted into a time sequence of characteristic patterns. Computation part 3 receives the output of the feature extracting part 1, and carries out matching computation by using multiple reference templates for each categories. The averaging part 4 makes an average of a smallest k distances for each group of results of the matching computations. Recognition part 5 makes a recognition result output, that is, the category code corresponding to the above-mentioned reference templates group having nearest average value of distance among the averaged results of the above-mentioned averaging part 4.

However, in the above-mentioned conventional configuration, though recognition accuracy rate for the above-mentioned characteristic pattern can be improved by increasing a number N of reference templates for each category and a number k of distances to be averaged by the averaging part 4, the time required for recognition in such an increased number of reference templates as well as the number k of the distances to be averaged becomes undesirably long and large. That is, in comparison with a simplest case where only one reference template for each category is provided (N=1, K=1), the above-mentioned system requires such a long time for matching computation as N-times, besides needing one averaging computation.

Furthermore, as the number M of categories increases, time required for recognition is increased to M-times of the above-mentioned case. This is a further undesirable problem.

Therefore, there is a demand for a pattern recognition system capable of recognizing input pattern with a high speed processing and a high recognition accuracy.

SUMMARY OF THE INVENTION

A purpose of the present invention is to provide an improved system wherein the time required for recognition of an input pattern is drastically shortened without loss of recognition accuracy improvement merit which has been obtained by matching the characteristic pattern of input signals with multiple reference templates for each categories, as well as without an increase of memory capacity of reference templates.

In order to achieve the above-mentioned object of the invention, the pattern recognition system of the present invention comprises representative reference template memory means for storing representative ones of multiple reference templates for each category, pre-matching computation means for computation for matching between time sequence of characteristic pattern of input signal and said representative reference templates, and pre-matching means for issuing category code(s) and pre-matched distance(s) corresponding to representative reference templates of a predetermined number j having smallest distances among the pre-matched computation result; so that drastic shortening of time required for recognition is achievable with retaining highly improved recognition accuracy induced by matching between the time sequence of input signal and multiple reference templates for respective categories selected by said pre-matching, without any increase of necessary capacity of memory for reference templates, by reducing number of matching between representative reference template for each category and the time sequence of the characteristic pattern of the input signal.

The pattern recognition system in accordance with the present invention comprises pattern-extracting means for converting input signal into time sequence $A_i$ (i=1, 2, ... , I) of characteristic patterns representative reference template memory means for storing representative reference templates $\overline{B}^m$ (m=1, 2, ... , M) of multiple reference templates for each category m (m=1, 2, ... , M), reference template memory means for storing reference templates $B_n^m$ (n=1, 2, ... , N) which are other than the representative reference template $\overline{B}^m$ (m=1, 2, ... , M) (both said representative reference templates $\overline{B}^m$ (m=1, 2, ... , M) and said reference templates $B_n^m$ (n=1, 2, ... , N) comprise same feature parameter), pre-matching computation means for computing matching of the time sequence $A_i$ (i=1, 2, ... , I) of characteristic patterns with the representative reference templates $\overline{B}^m$ (m=1, 2, ... , M)

pre-matching means for outputting smallest j (j≧2) pre-matched distances, which are given by the pre-matching computation means, together with j (j≧2) corresponding category codes, computing means for computing matching the time sequence $A_i$ (i=1, 2, ... , I) of characteristic patterns with only reference templates, which are corresponding to the category codes issued from the pre-matching means, among reference templates stored in the reference template memory means, averaging means for producing average of smallest k distance(s) for each group consisting of distances between the time sequence $A_i$ (i=1, 2, ..., I) and the reference templates $B_n^m$ (n=1, 2, ..., N) and a distance between the time sequence $A_i$ (i=1, 2, ... , I) and the representative reference template $\overline{B}^m$ obtained by the pre-matching computation means, the averaging being made for each category code obtained through the computing for each category code by the pre-matching means, recognition means for recognizing a category code corresponding to a group, which consists of a representative reference template $\overline{B}^m$ and reference templates $\overline{B}^m$ (n=1, 2, ..., N) and is nearest to the time sequence $A_i$ (i=1, 2, ..., I).

BRIEF DESCRIPTION OF THE DRAWING

FIG. 2 is a block diagram of a pattern recognition system embodying the present invention.

FIG. 3 is a flow chart showing operation of the pattern recognition system of FIG. 2.

FIG. 4(b) is further detailed block diagram of the pattern recognition system of FIG. 2.

FIG. 7(b) is a further detailed block diagram of the pattern recognition system of FIG. 5.

DESCRIPTION OF THE PREFERRED EMBODIMENTS

Figure 1:
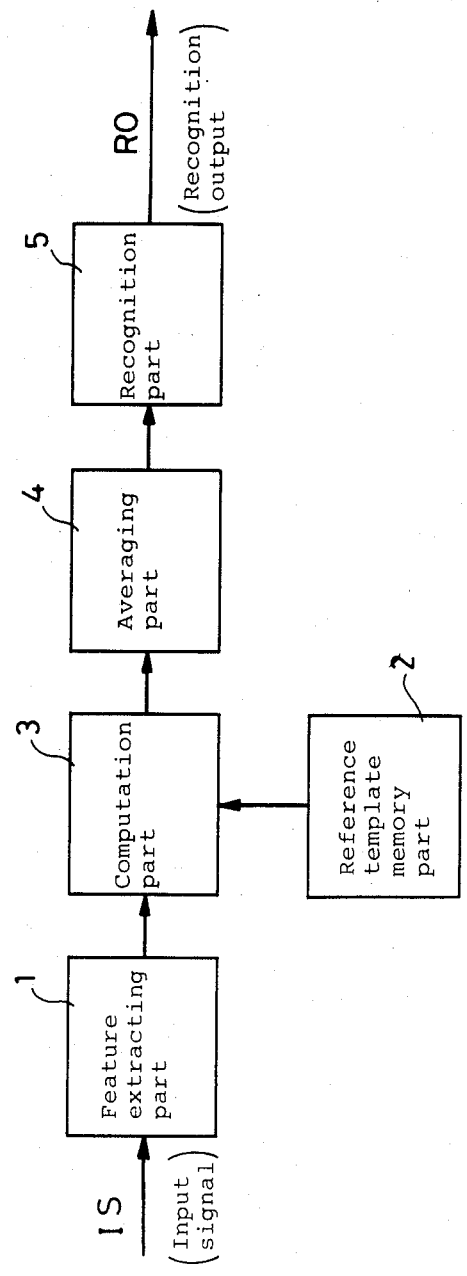
FIG. 1 is the block diagram showing a conventional voice pattern recognition system of the prior art.

Details of the present invention are described with reference to FIG. 2 through FIG. 4(b) which show a first embodiment and FIG. 5 through FIG. 7(b) which show a second embodiment.

A pattern recognition system of the first embodiment shown in FIG. 2 comprises a feature extracting part 11, a representative reference template memory part 12, a reference template memory part 13, a pre-matching computation part 14, a pre-matching part 15, a computation part 16, an averaging part 17 and a recognition part 18.

The operation of the above-mentioned pattern recognition system embodiment is as follows:

Input signals, for instance, a human-voice signal, is frequency-analyzed in the feature extracting part 11, and the input signal is converted into a time sequence $A_i = (a_{i1}, a_{i2}, a_{i3}, \ldots, a_{i16})$ (i=1, 2, ..., I) which is a 16-dimensional vector representing an electric power of 16-frequency ranges, made by using a dividing a frequency range of 400 Hz to 5 KHz using a logarithmic separation method. The pre-matching computation part 14 carries out a pre-matching computation between the time sequence $A_i$ (i=1, 2, ..., I) of the 16-dimensional vector, and a representative reference template in the representative reference template memory part 12 for respective categories denoted by m. Hereupon, the representative reference template stored in the representative reference template memory part 12 is a reference template (with a time sequence of a 16-dimensional vector) representing multiple reference templates (time sequence of 16-dimensional vector) for each category. For instance, assuming ten categories, and each category having seven reference templates (time sequence of 16-dimensional vector), among the seven reference templates (time sequence of 16-dimensional vector) one reference template having smallest distances on an average to the remaining six reference templates will be defined as the representative reference template $\overline{B}^m = (\overline{b}_1^m, \overline{b}_2^m, \overline{b}_2^m, \ldots, \overline{b}_{16}^m)$ (m=1, 2, ..., 10, category number). For instance, the representative reference template is selected in a manner that this representative reference template, gives a minimum value among maximum values of distances that this one representative reference template has against other reference templates (i.e., by mini-wax method). In the representative reference template memory part 12, the above-mentioned representative reference templates $\overline{B}^m = $ (m=1, 2, ..., 10) for the number of categories (i.e., 10) are stored. The pre-matching computation part 14 carries out computation of a city block distance by utilizing a dynamic programming method with respect to the time sequence $A_i$ (i=1, 2, ..., I) of characteristic patterns produced by the feature extracting part 11 and the representative reference templates $\overline{B}^m$ (m=1, 2, ..., 10) stored in the representative reference template memory part 12.

The pre-matching part 15 issues pre-matched distances together with their corresponding category codes, and the pre-matched distances are distances between the time sequence $A_i$ (i=1, 2, ..., I) and five smallest distances out of ten city block distances ($l_1, l_2, \ldots, l_{10}$) obtained by the pre-matching computing means 14 for ten representative reference templates $\overline{B}^m$ (m=1, 2, ..., 10). The computing means 16 carries out computation by utilizing dynamic programming methods to obtain city block distances with respect to categories among the ten categories, between the time sequence $A_i$ (i=1, 2, ..., I) (of a 16-dimensional vector) and only six reference templates (time sequence of 16-dimensional vector). This calculation occurs for only four categories corresponding to the five category codes obtained by the pre-matching part 15 among the multiple representative reference templates (time sequence of 16-dimensional vector) for each category stored in the representative reference template memory part 12.

Hereupon, the reference templates stored in the reference template memory part 13 are the remaining six reference templates (time sequence of 16-dimensional vector) $\overline{B}_1^m, \overline{B}_2^m, \ldots, \overline{B}_6^m$ (m=1, 2, ..., 10) excluding, the above-mentioned representative reference template (time sequence of a 16-dimensional vector) among multiple reference templates (time sequence of 16-dimensional vector) for each category. That is, for each category, the reference templates comprise seven reference templates in total, namely, one representative reference template $B^m$ and six reference templates $\overline{B}_n^m$ (n=1, 2, ..., 6).

In the reference template memory part 13, for each category, that is for respective ones of ten categories, the above-mentioned six reference templates (time sequence of 16-dimensional vector) $\overline{B}_n^m$ (n=1, 2, ..., 6; m=1, 2, ..., 10) are stored.

In the averaging part 17, for the five categories obtained by the above-mentioned pre-matching part 15, averaging operations are carried out to determine a smallest k city block distance(s) among the one (city block distance) issued from the pre-matching computation part 14 and the ones issued from the computation part 16 for the same category.

Recognition part 18 recognizes category codes corresponding to the nearest reference templates group among the five averaged distances issued from the averaging part 17, with respect to reference template groups corresponding to the five categories issued from the pre-matching part 15.

Operation of the above-mentioned first embodiment is shown in FIG. 3. In the flow chart of FIG. 3, a block 20 designates the input signal IS of FIG. 2, a block 21 the operation of the feature extracting part 11, a block 22 the operation of pre-matching computation part 14 of FIG. 2, a block 24 the operation of the pre-matching part 15 of FIG. 2, a block 26 the operation of the computation part 16 of FIG. 2, a block 27 the operation of the averaging part 17 of FIG. 2, and blocks 28 through 29, the operations of the recognition part 18, respectively. As shown in FIG. 3, voices of Japanese pronunciation for numerals 0, 1, 2, ..., 8 and 9 are allotted as the categories. When an input voice for 0 is given to the input terminal, the feature extracting stage 21 extracts characteristic patterns of the Japanese voice for 0 and produces a time sequence of characteristic pattern. And then, a matching computation between input time sequence and representative reference templates (those selected by the aforementioned mini-max method) corresponding to the categories of 0, 1, ..., 9 of m is carried out by the stage 22. The stage 24 includes five categories 0, 3, 6, 7 and 9 which correspond to the five nearest distances selected as above. stage 26, then performs a matching computation of the reference templates corresponding to five categories 0, 3, 6, 7 and 9 with the input time sequence carried out. In this way averaged distances with respect to the five categories 0, 3, 6, 7 and 9 is produced by averaging the results of matching computation with respect to the five categories 0, 3, 6, 7 and 9. In the stage 28, by recognizing a category to give minimum value of the above-mentioned averaged distance, for instance 0, a category code output signal "0" is issued.

As a result of the above-mentioned procedures, the input voice signal is recognized.

Figure 4A:
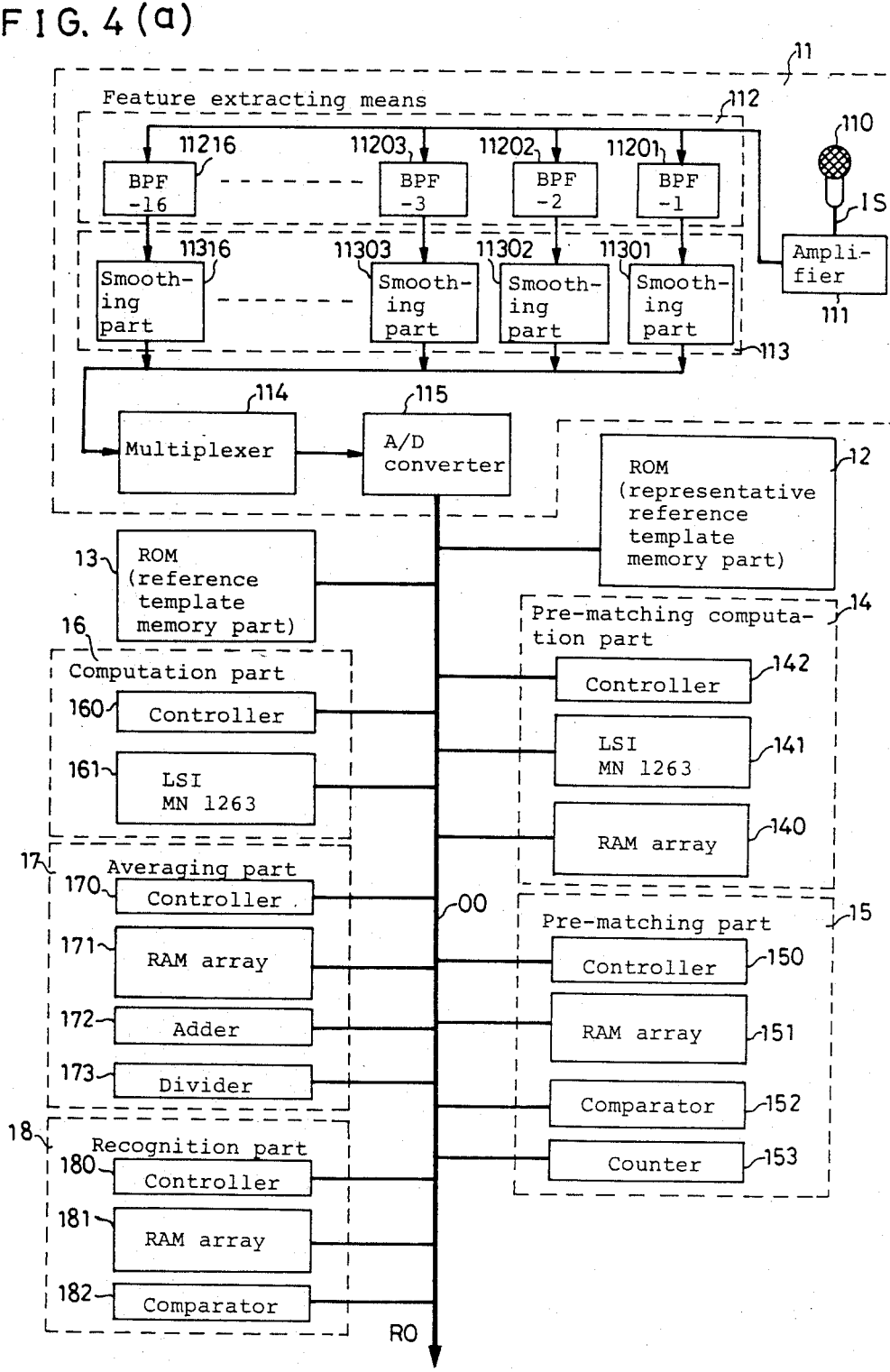
FIG. 4(a) is a detailed block diagram of the pattern recognition system of FIG. 2.

FIG. 4(a) is a detailed circuit block diagram of various parts shown by FIG. 2.

In FIG. 4(a), the feature extracting part 11 corresponds to the same designated part of FIG. 2, and comprises a microphone 110, an amplifier 111, a bank 112 of band pass filters (BPF) 11201, 11202, 11203, ..., 11216, which is allotted for sixteen audio frequency ranges from 400 Hz through 5 KHz having their center frequencies fixed at about ¼ octave intervals. Smoothing part 113 comprises smoothing circuits 11301, 11302, ..., 11316 connected to the corresponding BPFs, 11201, 11202, ..., 11216, respectively, and sixteen parallel output signals of the smoothing part 113 are given to a multiplexer 114, whose output is further given to an A/D converter 115.

Representative reference template memory part 12 comprising ROM(s) corresponds to the same part 12 in FIG. 2. The reference template memory part 13 which corresponds to the part of the same numeral in FIG. 2 which here is formed of a ROM(s).

Pre-matching computation part 14 corresponds to the part of the same numeral of FIG. 2, and comprises an input buffer constituted with RAM array 140, a known signal processing LSI 141 (MN 1263 of Matsushita Electric Industrial Co., Ltd. (technical details of this have been disclosed in IEEE Transactions, Consumer Electronics, Vol. CE-28, No. 3, pp 263–270, August 1982.) and a controller 142.

Pre-matching part 15 corresponds to the part of the same numeral in FIG. 2, and comprises a controller 150, RAM array 151, a comparator 152 and a counter 153.

Computation part 16 corresponds to the part of the same numeral in FIG. 2, and comprises a controller 160, a signal processing LSI 161 (MN 1263 of Matsushita Electric Industrial Co., Ltd.).

Averaging part 17 corresponds to the part of the same numeral in FIG. 2, and comprises a controller 170, RAM array 171, an adder 172 and a divider 173.

Recognition part 18 corresponds to the part of the same numeral in FIG. 2, and comprises a controller 180, RAM array 181 and a comparator 182.

Hereafter, operation of the pattern recognition system of the first embodiment constituted as above-mentioned is described with reference to FIG. 4(b) which is a further detailed circuit block diagram showing connections between the above-mentioned component circuits, wherein connections shown by parallel lines show those through the bus-line.

The input voice signal (input pattern) is converted by the microphone 110 an electric signal, and amplified by the amplifier 111 to an appropriate level where good signal power to quantizing noise power ratio (quantizing SN ratio) is obtainable even after A/D conversion by the A/D converter 115. The amplified electric signal is divided into sixteen band-divided signals having frequency bands corresponding to respective band-pass filters in the band-pass filter bank 112. The frequency-divided signals are then smoothed and converted into voltages (channel voltages) proportional to the signal power of respective divided frequency bands. Then using multiplexer 114, the time-parallel converted signals are sampled at predetermined time pitches to produce a time sequential signal, and thereafter converted into a digital signal by the A/D converter 115, thereby to produce a time sequence of having a 16-dimensional vector (of characteristic pattern, hence is referred to as simply characteristic pattern) corresponding to the above-mentioned input voice signal (input pattern). The time sequence $A_i$ is represented as follows:

$$A = (A_1, A_2, \ldots, A_i, \ldots, A_l) \tag{1}$$

wherein $$A_i = (a_{i1}, a_{i2}, \ldots, a_{i16}) \tag{1'}$$

The suffix i represents times, and a time i is referred to as the i-th frame. The characteristic pattern vector A is matching-computed with representative reference templates stored in the representative reference template memory means 12 in the pre-matching computation part 14 as hereafter described. The representative reference templates stored in the representative reference templates memory part 12 is a reference pattern (time sequence of 16-dimensional vector) representing multiple reference templates (time sequence of 16-dimensional vector) for each category. In case, for instance, each category has seven reference templates (time sequence of 16-dimensional vector) for ten categories, one reference template (time sequence of 16-dimensional vector) selected from a set of seven reference templates (time sequence of 16-dimensional vector) having a smallest city block distance on an average to the remaining six reference templates becomes the representative reference templates $B^m = (b_1^m, b_2^m, \ldots, b_{16}^m)$ ($m = 1, 2, \ldots, 10$; category number). For instance, the selection of the one template is made by a mini-max method, wherein, with respect to various reference templates, among the maximum values of distances which are those from one reference template to the remaining reference templates, the minimum of the above maximum value is selected.

In the representative reference template memory part 12, the number of representative reference templates corresponds to the number of categories, that is, ten of the above-mentioned representative reference templates $\overline{B^m}$ (m=1, 2, ..., 10) and category codes corresponding to them are stored. In the reference template memory part 13, six reference templates for respective categories, that is, $\overline{B_1^m}, \overline{B_2^m}, ..., \overline{B_6^m}$ are stored.

The above-mentioned characteristic pattern A is temporarily stored in an input buffer 140 of the pre-matching computation part 14. Control part 142 of the pre-matching computation part 14 carries out a computation of city block distance lm, by utilizing a dynamic programming method, between the characteristic pattern A and the above-mentioned representative reference templates $\overline{B^m}$ in the signal processing LSI (MN 1263 of Matsushita Electric Industrial Co., Ltd.) as follows:

$$l_m = \|A - \overline{B^m}\| \quad (m = 1, 2, 3, ..., 10), \quad (2)$$

$$= \frac{g(I, J_m)}{I + J_m}, \quad (3)$$

wherein $$g(0, 0) = d(0, 0), \quad (4)$$

$$g(x, y) = \min \begin{pmatrix} d(x, y) + g(x, y - 1) \\ 2d(x, y) + g(x - 1, y - 1) \\ d(x, y) + g(x - 1, y) \end{pmatrix}, \quad (5)$$

$$d(x, y) = \sum_{k=1}^{16} |a_{ik} - \overline{b_{jk}^m}|, \quad (6)$$

where d(x, y) is city block distance between the i-th frame of the above-mentioned characteristic pattern A and the j-th frame of the representative reference template $\overline{B^m}$, g(x, y) is cumulative distance, $a_{ik}$ is output electric power value of k-th band pass filter in the i-th frame of the above-mentioned characteristic pattern A, $b_{jk}^m$ is the k-th element of vector (element of k-th channel) of the j-th frame of the above-mentioned representative reference templates $\overline{B^m}$, $$\frac{I}{J_m} \cdot y - 2 < x < \frac{I}{J_m} \cdot y + 2, \quad (7)$$

wherein

I is total number of frame(s) of the above-mentioned characteristic pattern, $J_m$ is number of total frame(s) of the above-mentioned reference templates.

In the above-mentioned pre-matching part 15, firstly, distances $l_1, l_2, ..., l_{10}$ obtained by the above-mentioned pre-matching computation part 14 with respect to ten of the above-mentioned representative reference template $\overline{B^m}$ (m=1, 2, 3, ..., 10) are temporarily stored in the RAM array 151.

The controller 150 firstly clears the content q of the counter 153 so that q=0. Then the controller 150 command the comparator 152 to compare the distances $l_1, l_2, ..., l_{10}$ stored in the RAM array 151 in turn, to find the smallest distance. Then, the controller 150 sends six reference templates $\overline{B_1^m}, \overline{B_2^m}, ..., \overline{B_6^m}$ which are of the same category as those of the representative reference templates which give the smallest distance among ten representative reference templates stored in the representative reference template memory part 12, by reading them out from the reference pattern memory part 13, to the computing part 16. At the same time, the controller 150 find the smallest distance to the RAM array 171 of the averaging part 17, and clears data on an address holding the smallest distance of the above-mentioned RAM array 151, for instance, by (FFFF)$_{16}$ (in hexadecimal), and counts up the contents q of the counter 153 to q=q+1. Then, the controller 150 repeats this in a similar way, until the contents q of the counter 153 becomes q=5, thereby issuing the smallest value of distance stored in the RAM array 151 by means of the comparator 152. At the same time, the controller 150 causes the six reference templates $\overline{B_1^m}, \overline{B_2^m}, ..., \overline{B_6^m}$ which is of the same category as the representative templates, to give the above-mentioned minimum distance are read out from the reference template memory part 13 and gives to the computing part 16. Furthermore, the smallest distance is given to the RAM array 171 of the averaging part 17, and contents of the RAM array at the address where the smallest distances are stored is cleared, and the contents q of the counter 153 is counted up. The above-mentioned operations are repeated.

In the computation part 16, the controller 160 makes, using the signal processing LSI (MN 1263 of Matsushita Electric Industrial Co., Ltd.), a computation between six reference templates for each category of the five categories sent from the above-mentioned pre-matching part 15 and the above-mentioned characteristic pattern stored in the RAM array 141, and issues the output distances to the RAM array 171.

Hereupon, the reference templates stored in the reference template memory part 13 are the remaining six reference templates (time sequence of 16-dimensional vector) $\overline{B_1^m}, \overline{B_2^m}, ..., \overline{B_6^m}$ (m=1, 2, ..., 10) than the above-mentioned representative reference templates (time sequence of 16-dimensional vector) among multiple reference templates (time sequence of 16-dimensional vector) for each category. That is, for each category, the reference templates comprise seven reference templates in total, namely, one representative reference template $\overline{B^m}$ and six reference templates $\overline{B_n^m}$ (n=1, 2, ..., 6). In the reference template memory part 13, for each category, that is for respective ones of ten categories, the above-mentioned six reference templates (time sequence of 16-dimensional vector) $\overline{B_n^m}$ (n=1, 2, ..., 6; m=1, 2, ..., 10) are stored.

In the averaging part 17, for the five categories obtained by the above-mentioned pre-matching part 15, averaging the of smallest seven city block distance(s) are carried out for the one group consisting of city block distances between the time sequence $A_i$ (i=1, 2, ..., I; time sequence of 16-dimensional vector) of input signal and the above-mentioned representative reference templates $\overline{B_n^m}$ (n=1, 2, ..., N) and the other six city block distances issued from the computation part 16 for the same category part 16 and summed up by the adder 172, and then the resultant sum is divided by the 7, and average value $L_m$ is produced. The above-mentioned five averaged values and category codes corresponding thereto are then sent to the RAM array 181 of the recognition part 18. In the recognition part 18, the controller 180 makes sequential comparisons of the above-mentioned five averaged distances corresponding to five categories stored in the RAM array 181 after having been given from the averaging part 17 by means of comparator 182, thereby recognizes a category code corresponding to the smallest value of average distance among the above-mentioned category codes stored in the RAM array 181, and issues the recognized output.

As has been described in detail, according to the present embodiment, the representative reference template memory part 12, pre-matching computation part 14 and pre-matching part 15 are provided. These carry out an operation of, firstly, making a matching computation between characteristic patterns of input signal and one representative reference template for each category among seven reference templates for each of the categories, and selecting five categories among ten categories corresponding to the five representative reference templates of the smallest distances with characteristic pattern of the input signal, an amount of matching computation of characteristic patterns of the input signal with reference templates can be decreased to about half of the conventional method. Therefore, the time required for recognition can be shortened, while retaining the improving merit of high recognition accuracy achieved by carrying out matching between the characteristic pattern of the input signal and multiple reference templates for each category, and without the necessity of increasing the memory capacity of the reference templates and any particular pre-matching means.

The actual advantage of this embodiment is compared in detail with the conventional part. When voices of reading numerals of 0, 1, 2, . . . , 8, 9 in Japanese language are allotted as the category, and when each category has seven reference templates, the processing from the above-mentioned pre-matching part 14 through the recognition part 18 shown in FIG. 3 takes about 0.25 msec for each frame of the above-mentioned input voice signal. Therefore, in the conventional case of FIG. 1, the voice recognition takes out 0.25 msec×16 frame×7 (reference template)×10 (categories)≈280 msec, because the average number of frames for one input voice signal is about 16 frames (wherein the frame period is 25.6 msec) and the above-mentioned one voice input signal has an average time length of 25.6 msec×16≈410 msec. On the contrary, in case of the present embodiment shown in FIG. 2 through FIG. 4(b), the time required for recognition becomes 0.25 msec×16 frame×{10 (representative reference templates)+6 (reference templates)×5 (categories)}≈160 msec, and this processing time is shorter than the conventional processing time by 43%. Experimental tests showed recognition accuracy of this embodiment was over 95% and the recognition accuracy is satisfactory for actual use.

Though the above-mentioned embodiment described showing one example where the input signal is voice, the input signal is not limited in voice, but may be, for instance, hand-written characters and letters. The above-mentioned frequency analyzing of frequency band of 400 Hz to 5 KHz into a 16-dimensional vector has been used, but the frequency band width and dimensions of vector may be selected arbitrarily. Furthermore, besides the frequency analyzing method, self-correlation coefficient, zero cross-times of any analyzing method that can extract characters of input signals may be used as a parameter of the analysis. Furthermore, besides the above-mentioned dynamic programming method in computation of the pattern matching between the characteristic pattern of input signal and reference template, a linear matching method may be used. For the distance, besides the above-mentioned city block distance, a Euclidian distance, Mahalanobis distance or any distance which can express distance between both may be applicable.

Figure 5:
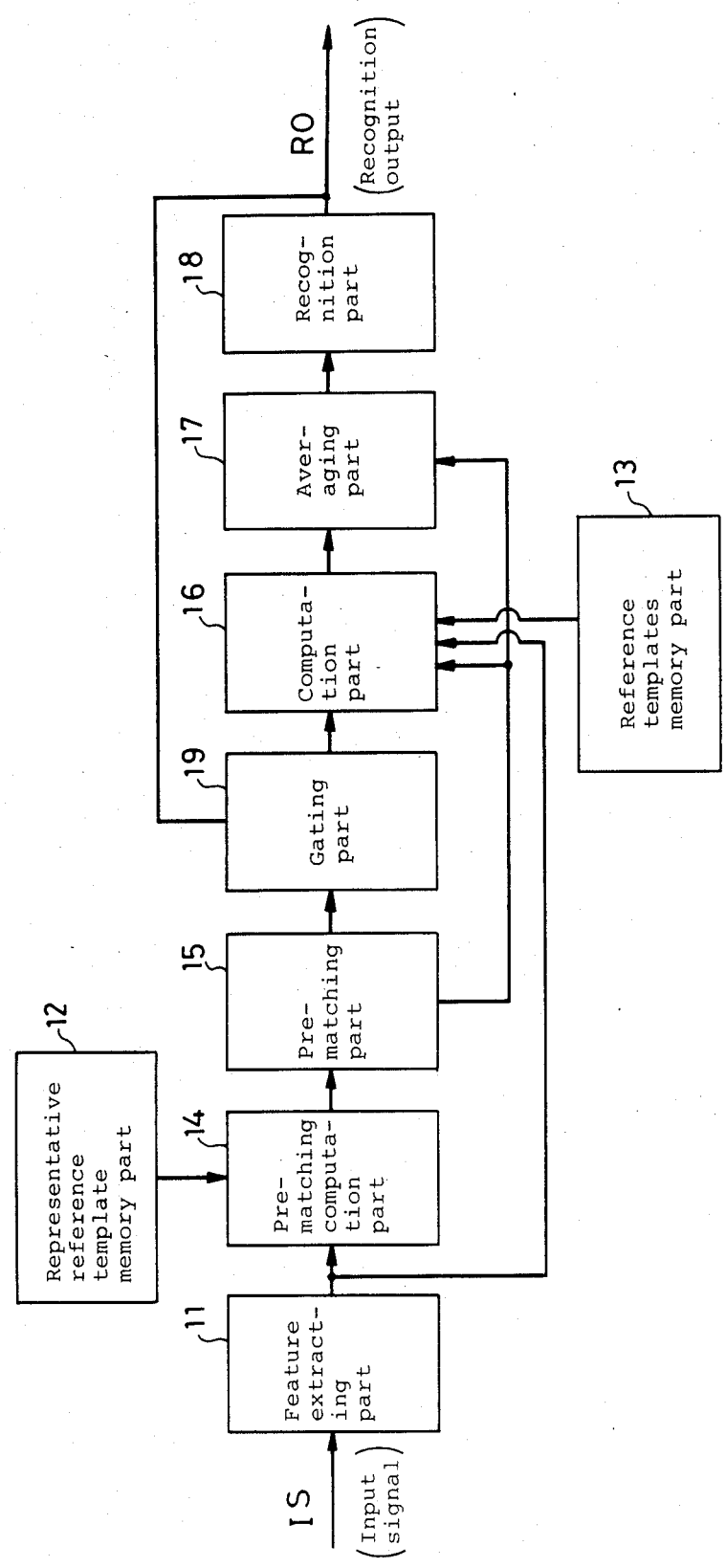
FIG. 5 is a block diagram of a pattern recognition system of another embodiment of the present invention.

FIG. 5 shows a second embodiment in accordance with the present invention.

This embodiment is improved over the first embodiment in order to attain a higher speed of recognition by providing a gating part. That is, the pattern recognition system of the second embodiment shown in FIG. 5 comprises a feature extracting part 11, a representative reference template memory part 12, a reference template memory part 13, a pre-matching computation part 14, a pre-matching part 15, a computation part 16, an averaging part 17, a recognition part 18 and a gating part 19.

The operation of the above-mentioned pattern recognition system embodiment is as follows:

Input signals, for instance, human-voice signal, are frequency-analized in the feature extracting part 11, wherein the input signal is converted into a time sequence $A_i=(a_{i1}, a_{i2}, a_{i3}, \ldots, a_{i16})$ ($i=1, 2, \ldots, I$) which is a 16-dimensional vector representing electric power of 16-frequency ranges made by by dividing a frequency range of 400 Hz to 5 KHz by logarithmic separation method. The pre-matching computation part 14 carries out pre-matching computation between the time sequence $A_i$ ($i=1, 2, \ldots, I$) of 16-dimensional vector and representative reference template in the representative reference template memory part 12 for respective categories. Hereupon, the representative reference template stored in the representative reference template memory part 12 is a reference template (time sequence of 16-dimensional vector) representing multiple reference templates (time sequence of 16-dimensional vector) for each category. For instance, when, with respect to ten categories, each category has seven reference templates (time sequence of 16-dimensional vector), among the seven reference templates (time sequence of 16-dimensional vector) one reference template (time sequence of 16-dimensional vector) having smallest distances on an average to the remaining six reference templates is defined as the representative reference template $\overline{B^m}=(\overline{b_1^m}, \overline{b_2^m}, \overline{b_2^m}, \ldots, \overline{b_{16}^m})$ ($m=1, 2, \ldots, 10$; category number). For instance, the representative reference template is selected so that a distance between it and each reference template, gives a minimum value among maximum values of distances that one reference template has against other reference templates (i.e., by mini-max method). That is, said representative reference template and the reference templates comprise same feature parameters. In the representative reference template memory part 12, the above-mentioned representative reference templates $\overline{B^m}=(m=1, 2, \ldots, 10)$ for the number of categories (i.e., 10) are stored. The pre-matching computation part 14 carries out computation of city block distance by utilizing a dynamic programming method with respect to the time sequence $A_i$ ($i=1, 2, \ldots, I$) of characteristic patterns produced by the feature extracting part 11 and the representative reference templates $\overline{B^m}$ ($m=1, 2, \ldots, 10$) stored in the representative reference template memory part 12.

The pre-matching part 15 issues only one category code corresponding to a representative reference template which gives a smallest distance when the smallest distance $l_{min}$ is smaller than a predetermined threshold value L. On the other hand, when the smallest distance $l_{min}$ of the city block distance $l_m$ (m=1, 2, ..., 10) is equal to or larger than the predetermined threshold value L, the pre-matching part 15 issues pre-matched distances of five nearest city block distances obtained by the pre-matching computing means 14 for ten representative reference templates $\overline{B^m}$ (m=1, 2, ..., 10) together with the corresponding category code.

In the gating part 19, when the output of the pre-matching part 15 has only one category code, the category code as such is put out as the recognition result; and on the contrary, in case the output of the pre-matching part 15 has five pre-matched distances together with five category codes, then the output signal issued is that which is for carrying out matching computation with respect to the reference templates (time sequence of 16-dimensional vector) corresponding to the five categories among the reference template stored in the reference template memory part 13.

Hereupon, the reference templates stored in the reference template memory part 13 are remaining six reference templates (time sequence of 16-dimensional vector) $\overline{B_1^m}, \overline{B_2^m}, \ldots, \overline{B_6^m}$ (m=1, 2, ..., 10) excluding the above-mentioned representative reference template (time sequence of 16-dimensional vector) among multiple reference templates (time sequence of 16-dimensional vector) for each category. That is, for each category, the reference templates comprise seven reference templates in total, namely, one representative reference template $\overline{B^m}$ and six reference templates $\overline{B_n^m}$ (n=1, 2, ..., 6).

In the reference template memory part 13, for each category, that is for respective ones of ten categories, the above-mentioned six reference templates (time sequence of 16-dimensional vector) $\overline{B_n^m}$ (n=1, 2, ..., 6; m=1, 2, ..., 10) are stored. On the other hand, the reference template memory part 13 is storing, for each category, that is in ten categories in this embodiment, the above-mentioned six reference templates (time sequence of 16-dimensional vector) $\overline{B_n^m}$ (n=1, 2, ..., 6; m=1, 2, ..., 10).

The computing means 16 carries out computation by utilizing the dynamic programming methods for city block distances with respect to ten categories, between the time sequence $A_i$ (i=1, 2, ..., I) (of 16-dimensional vector) and only six reference templates (time sequence of 16-dimensional vector) corresponding to five category codes obtained by the pre-matching part 15 among multiple reference templates (time sequence of 16-dimensional vector) for each category stored in the reference template memory part 12.

In the averaging part 17, for five categories obtained by the above-mentioned pre-matching part 15, averagings are carried out concerning smallest k city block distance(s) among the one (city block distance) issued from the pre-matching computation part 14 and the ones issued from the computation part 16 for the same category.

Recognition part 18 recognizes category codes corresponding to nearest reference templates group among five averaged distance issued from the averaging part 17, with respect to reference templates group corresponding to the five categories issued from the pre-matching part 15.

Figure 6:
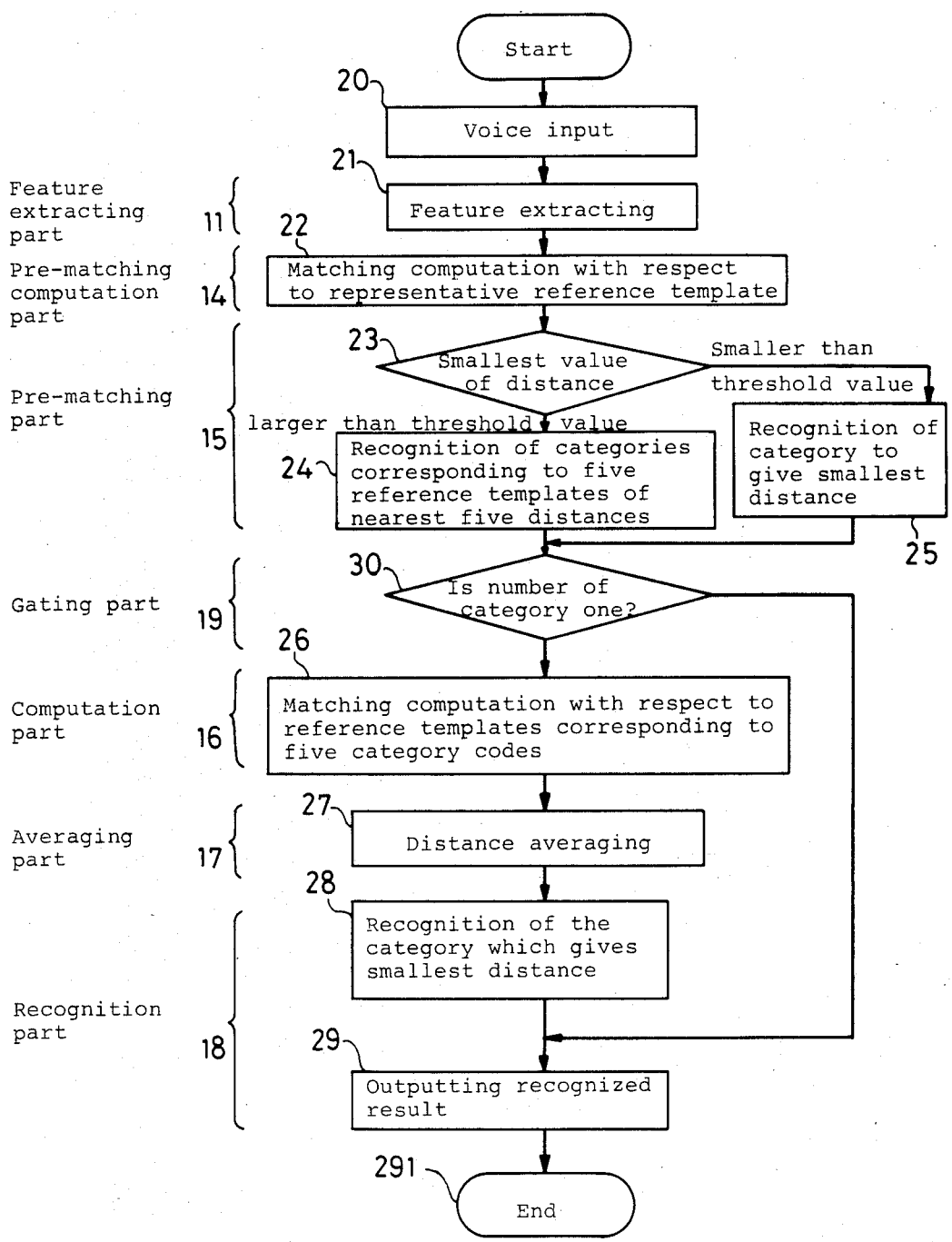
FIG. 6 is a flow chart showing operation of the pattern recognition system of FIG. 5.

Operation of the above-mentioned second embodiment is shown in FIG. 6. In the flow chart of FIG. 6, a block 20 designates input signal IS of FIG. 5, a block 21 the operation of the feature extracting part 11, a block 22 the operation of pre-matching computation part 14 of FIG. 5, blocks 23-25 the operations of the pre-matching part 15 of FIG. 5, a block 26 the operation of the computation part 16 of FIG. 5, a block 27 the operation of the averaging part 17 of FIG. 5, and blocks 28 through 29, the operations of the recognition part 18, and a block 30 the operation of the gate part 19 of FIG. 5, respectively. As shown in FIG. 3, voices of Japanese pronunciation for numerals 0, 1, 2, ..., 8 and 9 are allotted as the categories. When input voice for 0 is given to the input terminal, the feature extracting stage 21 extracts characteristic patterns of the Japanese voice for 0 and produces a time sequence of characteristic pattern. And then, matching computation between input time sequence and representative reference templates (those selected by the aforementioned mini-max method) corresponding to the categories of 0, 1, ..., 9 of m is carried out by the stage 22, and thereafter in the stage 24 five categories 0, 3, 6, 7 and 9 which correspond to five nearest distances are selected. in the operation stage 30, a detection is made of whether category code of input signal to the gating part 19 is only one, or another larger number (five, in this embodiment). And when the detection result is that the category is only one, the output is issued as such in the stage 29. On the contrary, when the category code of input signal to the gating part 19 is five, then, in the stage of 26, matching computation of the reference templates corresponding to five categories 0, 3, 6, 7 and 9 with the input time sequence are carried out, and thereby, an averaged distance with respect to the five categories 0, 3, 6, 7 and 9 is produced by averaging the results of matching computation with respect to the five categories 0, 3, 6, 7 and 9. In the stage 28, by recognizing a category to give minimum value of the above-mentioned averaged distance, for instance 0, a category code output signal "0" is issued.

As a result of the above-mentioned procedures, the input voice signal is recognized.

Figure 7A:
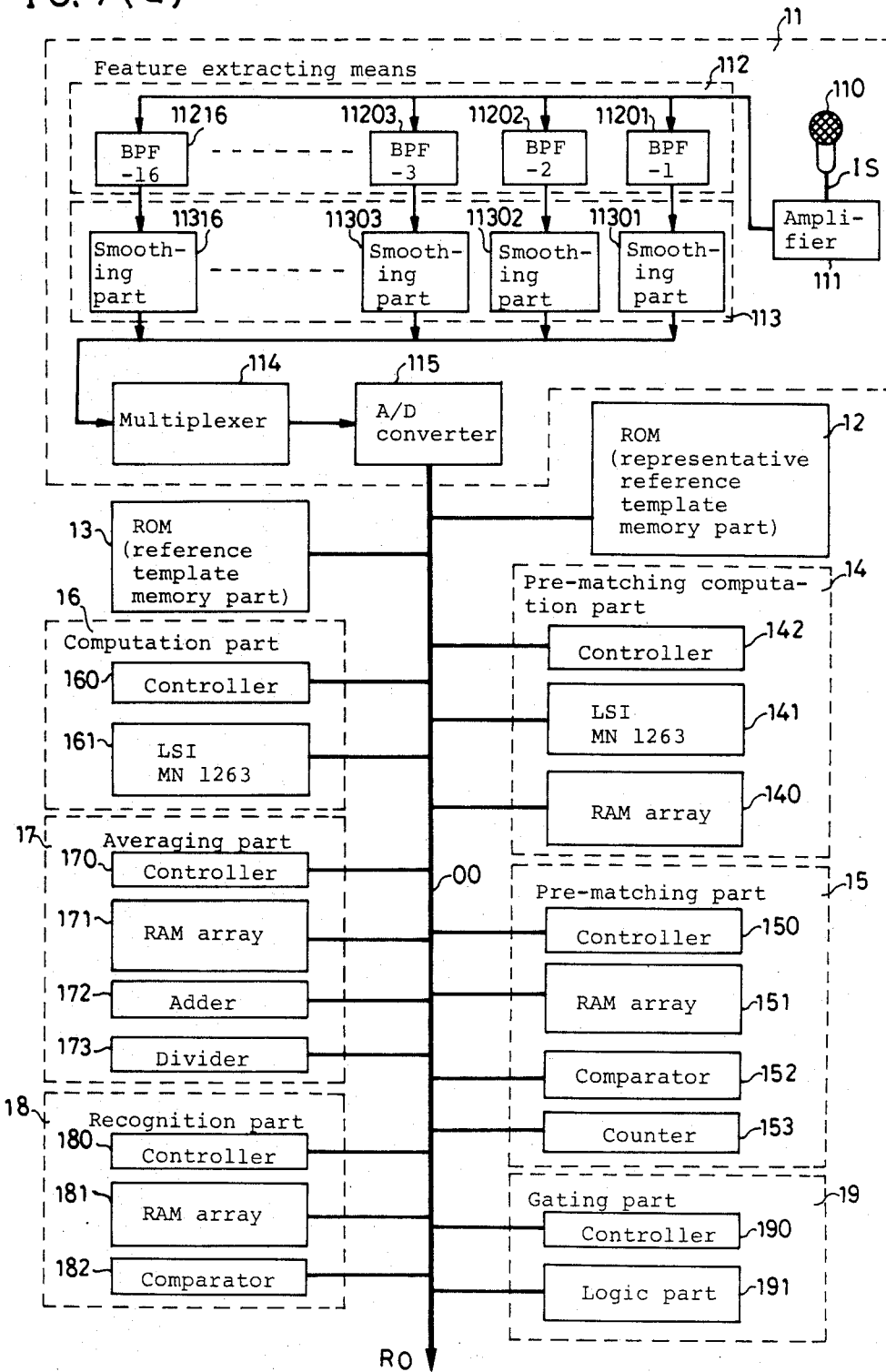
FIG. 7(a) is a detailed block diagram of the pattern recognition system of FIG. 5.

FIG. 7(a) is a detailed circuit block diagram of various parts shown by FIG. 5.

In FIG. 7(a), the feature extracting part 11 corresponds to the same designated part of FIG. 2, and comprises a microphone 110, an amplifier 111, a bank 112 of band pass filter (BPF) 11201, 11202, 11203, ..., 11216, which is allotted for sixteen audio frequency ranges from 400 Hz through 5 KHz having their center frequencies fixed with about ¼ octave intervals. Smoothing part 113 comprises smoothing circuits 11301, 11302, ..., 11316 connected to the corresponding BPFs, 11201, 11202, ..., 11216, respectively, and sixteen parallel output signals of the smoothing part 113 are given to a multiplexer 114, whose output is further given to an A/D converter 115.

Representative reference template memory part 12 comprising ROM(s) corresponds to the same part 12 in FIG. 2. The reference template memory part 13 which corresponds to the part of the same numeral in FIG. 5 also comprises a ROM(s).

Pre-matching computation part 14 corresponds to the part of the same numeral of FIG. 5, and comprises an input buffer constituted with RAM array 140, a known signal processing LSI 141 (MN 1263 of Matsushita Electric Industrial Co., Ltd. Technical details has been disclosed in IEEE Transaction, Consumer Electronics, Vol. CE-28, No. 3, pp 263-270, August 1982.) and a controller 142.

Pre-matching part 15 corresponds to the part of the same numeral in FIG. 5, and comprises a controller 150, RAM array 151, a comparator 152 and a counter 153.

Computation part 16 corresponds to the part of the same numeral in FIG. 5, and comprises a controller 160, a signal processing LSI 161 (MN 1263 of Matsushita Electric Industrial Co., Ltd.).

Gating part 19 corresponds to the part of the same numeral in FIG. 5, and comprises a controller 190 and a logic gate 191.

Averaging part 17 corresponds to the part of the same numeral in FIG. 5, and comprises a controller 170, RAM array 171, an adder 172 and a divider 173.

Recognition part 18 corresponds to the part of the same numeral in FIG. 5, and comprises a controller 180, RAM array 181 and a comparator 182.

Hereafter, operation of the pattern recognition system of the first embodiment constituted as above-mentioned is described with reference to FIG. 7(b) which is a further detailed circuit block diagram showing connections between the above-mentioned component circuits, wherein connections shown by parallel lines show those through the bus-line.

The input voice signal (input pattern) is converted by the microphone 110 into electric signal, and amplified by the amplifier 111 to such an appropriate level that good signal power to quantizing noise power ratio (quantizing SN ratio) is obtainable even after A/D conversion by the A/D converter 115. The amplified electric signal is divided into sixteen band-divided signals having frequency band corresponding to respective band-pass filter in the band-pass filter bank 112. The frequency-divided signals are then smoothed and converted into voltages (channel voltages) proportional to the signal power of respective divided frequency bands. Then by means of multiplexer 114, the time-parallel converted signals are sampled by predetermined time pitches thereby to produce a time sequential signal, and thereafter converted into digital signal by the A/D converter 115, thereby to produce a time sequence of 16-dimensional vector (of characteristic pattern, hence is referred to hereafter as characteristic pattern) corresponding to the above-mentioned input voice signal (input pattern). The time sequence $A_i$ is represented as follows:

$$A = (A_1, A_2, \ldots, A_i, \ldots, A_I) \tag{1}$$

wherein $$A_i = (a_{i1}, a_{i2}, \ldots a_{i16}) \tag{1'}$$

The suffix i represents times, and a time i is referred to as i-th frame. The characteristic pattern vector A is matching-computed with representative reference templates stored in the representative reference template memory means 12 in the pre-matching computation part 14 as hereafter described. The representative reference templates stored in the representative reference templates memory part 12 is reference pattern (time sequence of 16-dimensional vector) representing multiple reference templates (time sequence of 16-dimensional vector) for each category. In case, for instance, each category has seven reference templates (time sequence of 16-dimensional vector) for ten categories, one reference template (time sequence of 16-dimensional vector) selected from a set of seven reference templates (time sequence of 16-dimensional vector) having a smallest city block distance on an average to the remaining six reference templates becomes the representative reference templates $\overline{B^m} = (\overline{b_1^m}, \overline{b_2^m}, \ldots, \overline{b_{16}^m})$ (m=1, 2, ..., 10; category number). For instance the selection of the one template is made by a mini-max method, wherein, with respect to various reference templates, among the maximum values of distances which are those from one reference template to the remaining reference templates, the minimum of the above maximum value is selected.

In the representative reference template memory part 12, number of representative reference templates corresponds to number of categories, that is, ten of the above-mentioned representative reference templates $\overline{B^m}$ (m=1, 2, ..., 10) and category codes corresponding to them are stored. In the reference template memory part 13, six reference templates for respective categories, that is, $\overline{B_1^m}, \overline{B_2^m}, \ldots, \overline{B_6^m}$ are stored.

The above-mentioned characteristic pattern A is temporarily stored in an input buffer 140 of the pre-matching computation part 14. Control part 142 of the pre-matching computation part 14 carries out computation of city block distance lm, by utilizing dynamic programming method, between the characteristic pattern A and the above-mentioned representative reference templates $\overline{B^m}$ in the signal processing LSI (MN 1263 of Matsushita Electric Industrial Co., Ltd.) as follows:

$$l_m = \| A - \overline{B^m} \| \quad (m = 1, 2, 3, \ldots, 10), \tag{2}$$

$$= \frac{g(I, J_m)}{I + J_m}, \tag{3}$$

wherein $$g(0, 0) = d(0, 0), \tag{4}$$

$$g(x, y) = \min \begin{pmatrix} d(x, y) + g(x, y - 1) \\ 2d(x, y) + g(x - 1, y - 1) \\ d(x, y) + g(x - 1, y) \end{pmatrix}, \tag{5}$$

$$d(x, y) = \sum_{k=1}^{16} |a_{ik} - \overline{b_{jk}^m}|, \tag{6}$$

where d(x,y) is the city block distance lm, by utilizing dynamic programming method, between the i-th frame of the above-mentioned characteristic pattern A and the j-th frame of the representative reference template $\overline{B^m}$, g(x, y) is cumulative distance, $a_{ik}$ is output electric power value of k-th band pass filter in the i-th frame of the above-mentioned characteristic pattern A, $\overline{b_{jk}^m}$ is the k-th element of vector (element of k-th channel) of the j-th frame of the above-mentioned representative reference templates $\overline{B^m}$, $$\frac{I}{J_m} \cdot y - 2 < x < \frac{I}{J_m} \cdot y + 2, \tag{7}$$

wherein

I is total number of frame(s) of the above-mentioned characteristic pattern, $J_m$ is number of total frame(s) of the above-mentioned reference templates.

In the above-mentioned pre-matching part 15, firstly, distances $l_1, l_2, \ldots, l_{10}$ obtained by the above-mentioned pre-matching computation part 14 with respect to ten of the above-mentioned representative reference template $\overline{B}^m$ (m=1, 2, 3, ..., 10) are temporarily stored in the RAM array 151.

The controller 150 firstly clears content q of the counter 153 to realize q=0. Then the controller 150 makes the comparator 152 comparate the distances $l_1$, $l_2$, ..., $l_{10}$ stored in the RAM array 151 in turn to find the smallest distance. Then, the smallest distance $L_{min}$ is compared with a predetermined threshold value L on the comparator 152, and when $$l_{min} < L \tag{8},$$

only the category code corresponding to the representative reference template to give the smallest distance is issued. On the contrary, in case the above comparison result becomes $$l_{min} \geq L \tag{9},$$

then, the controller 150 sends six reference templates $\overline{B}_1^m, \overline{B}_2^m, \ldots \overline{B}_6^m$ which are of the same category as those of the representative reference templates which gives the smallest distance among ten representative reference templates stored in the representative reference template memory part 12, by reading them out from the reference pattern memory part 13, to the computing part 16. At the same time, the controller 150 makes the smallest distance to the RAM array 171 of the averaging part 17, and to clear data of an address holding the smallest distance of the above-mentioned RAM array 151, for instance, by $(FFFF)_{16}$ (in hexadecimal), and counts up contents q of the counter 153 to q=q+1. Then, the controller 150 repeating in the similar way, until the contents q of the counter 153 becomes q=5, thereby issuing the smallest value of distance stored in the RAM array 151 by means of the comparator 152. At the same time, the controller 150 causes that six reference templates $\overline{B}_1^m, \overline{B}_2^m, \ldots, \overline{B}_6^m$ which is of the category same as the representative templates to give the above-mentioned minimum distance are read out from the reference template memory part 13 and gives to the computing part 16. Furthermore, the smallest distance is given to the RAM array 171 of the averaging part 17, and contents of the RAM array at the address where the smallest distances are stored is cleared, and the contents q of the counter 153 is count up. The above-mentioned operations are repeated.

In the gating part 19, when the output of the pre-matching part 15 has only one category code, the controller 190 makes, by turning the logic gate 191 on, hence opening the output bus of the pattern recognition system of this embodiment, issues the sole category code put out from the pre-matching part 15, as recognition result output. On the contrary, when the output of the pre-matching part 15 has five pre-matched distances together with five category codes and six above-mentioned reference templates $\overline{B}_1^m, \overline{B}_2^m, \ldots, \overline{B}_6^m$ corresponding to respective ones of the five category codes, the gating part 19 issues a signal for driving the computation part 16 to the controller 160 of the computation part 16.

In the computation part 16, when the driving signal is given from the gating part 19, the controller 160 makes, on the signal processing LSI (MN 1263 of Matsushita Electric Industrial Co., Ltd.), a computation between six reference templates for each category of the five categories sent from the above-mentioned pre-matching part 15 and the above-mentioned characteristic pattern stored in the RAM array 141, and issues the output distances to the RAM array 171.

Hereupon, the reference templates stored in the reference template memory part 13 are remaining six reference templates (time sequence of 16-dimensional vector) $\overline{B}_1^m, \overline{B}_2^m, \ldots, \overline{B}_6^m$ (m=1, 2, ..., 10) excluding the above-mentioned representative reference templates (time sequence of 16-dimensional vector) among multiple reference templates (time sequence of 16-dimensional vector) for each category. That is, for each category, the reference templates comprise seven references templates in total, namely, one representative reference template $\overline{B}^m$ and six reference templates $\overline{B}_n^m$ (n=1, 2, ..., 6). In the reference template memory part 13, for each category, that is for respective ones of ten categories, the above-mentioned six reference templates (time sequence of 16-dimensional vector) $\overline{B}_n^m$ (n=1, 2, ..., 6; m=1, 2, ..., 10) are stored.

In the averaging part 17, for five categories obtained by the above-mentioned pre-matching part 15, averaging of smallest seven city block distance(s) are carried out, for the one group consisting of city block distances between the time sequence $A_i$ (i=1, 2, ..., I; time sequence of 16-dimensional vector) of input signal and the above-mentioned representative reference templates $\overline{B}_n^m$ (n=1, 2, ..., N) and other six city block distances issued from the computation part 16 for the same category part 16 are summed up the adder 172, and then the resultant sum is divided by the 7, and average value $L_m$ is produced. The above-mentioned five averaged value and category codes corresponding thereto are then sent to the RAM array 181 of the recognition part. In the recognition part 18, the controller 180 makes sequential comparisons of above-mentioned five averaged distances corresponding to five categories stored in the RAM array 181 after having been given from the averaging part 17, by means of comparator 182, thereby recognizes a category code corresponding to the smallest value of average distance among the above-mentioned category codes stored in the RAM array 181, and issues the recognized output.

As has been described in detail, according to the present embodiment, by providing the representative reference template memory part 12, pre-matching computation part 14, pre-matching part 15 and gating part 19, and by carrying out the operation that, firstly, making a matching computation between characteristic pattern of input signal and one representative reference template for each category among seven reference templates for each of the category followed by alternative procedure that in case the computed smallest city block distance is smaller than the threshold then recognizing the category to give the smallest distance and stops subsequent computation, or that in case the computed smallest city block distance is equal to or larger than the threshold then selecting and issuing five categories among ten categories corresponding to the five representative reference templates of the smallest distances with characteristic pattern of the input signal, amount of matching computation of characteristic pattern of the input signal with the reference templates can be decreased to about half of the conventional method, thereby can shorten the time required for recognition with retaining the improving merit of high recognition accuracy achieved by carrying out matching between the characteristic pattern of the input signal and multiple reference templates for each category, and without necessity of increasing the memory capacity of the reference templates and any particular pre-matching means.

The actual advantage of this embodiment is compared in detail with the conventional part. When voices of reading numerals of 0, 1, 2, ..., 8, 9 in Japanese language, are allotted as the category, and when each category has seven reference templates, the processings from the above-mentioned pre-matching part 14 through the recognition part 18 and the gating part 19 shown in FIG. 6 takes about 0.25 msec for each frame of the above-mentioned input voice signal, and therefore in the conventional case of FIG. 1, the voice recognition takes out 0.25 msec $\times$ 16 frame $\times$ 7 (reference template) $\times$ 10 (categories) $\approx$ 280 msec, because average number of frames for one input voice signal is about 16 frames (wherein frame period is 25.6 msec). Since the above-mentioned one voice input signal has average time length of 25.6 msec $\times$ 16 $\approx$ 410 msec. On the contrary, in case of the present embodiment shown in FIG. 5 through FIG. 7(b), since the probability that in the gating part 19 the category code from the pre-matching part 14 is issued as such as the recognition result is about 50%, the time required for recognition becomes 0.25 msec $\times$ 16 frame $\times$ {10 (representative reference templates) $\times$ 6 (reference templates) $\times$ 5 (categories) $\times$ 0.5 } $\approx$ 100 msec, and this processing time is shorter than the conventional processing time by about 65%. Experimental tests showed recognition accuracy of this embodiment was over 95% and the recognition accuracy is satisfactory for actual use.

Though the above-mentioned embodiment described showing one example where the input signal is voice, the input signal is not limited in voice, but may be, for instance, hand-written characters and letters. The above-mentioned frequency analyzing of frequency band of 400 Hz to 5 KHz into 16-dimensional vector has been used, but the frequency band width and dimensions of vector may be selected arbitrarily. Furthermore, besides the frequency analyzing method, self-correlation coefficient, zero cross-times or any analyzing method that can extract characters of input signals may be used as parameter of the analysis. Furthermore, besides the above-mentioned dynamic programming method in computation of the pattern matching between the characteristic pattern of input signal and reference template, linear matching method may be used. For the distance, besides the above-mentioned city block distance, Euclid distance, Mahalanobis distance or any distance which can express distance between both may be applicable.

What is claimed is:

1. A pattern recognition system comprising:
   pattern-extracting means for converting an input signal into a time sequence $A_i$ (i=1, 2, ..., I) of characteristic patterns;
   representative reference template memory means for storing representative reference templates $B^m$ (m=1, 2, ..., M) from among a plurality of reference templates $B^m$, said representative reference templates having smallest distances among said reference templates to the others of said reference templates;
   reference template memory means for storing reference templates $B_n^m$ (n=1, 2, ..., N) which are other than said representative reference templates $B^m$ (m=1, 2, ..., M) and have same feature parameters as said representative reference templates;
   pre-matching computation means for computing a matching between said time sequence $A_i$ (i=1, 2, ..., I) of characteristic patterns and said representative reference templates $B^m$;
   pre-matching means for outputting a number j of smallest pre-matched distances, which are given by said pre-matching computation means, together with j corresponding category codes, where j is greater than 2;
   computing means for computing a matching between said time sequence $A_i$ (i=1, 2, ..., I) of characteristic patterns and only those of said reference templates which correspond to said category codes issued from said pre-matching means among said reference templates stored in said reference template memory means;
   averaging means for producing an average of a smallest k distance(s) for each group of:
   (a) distances between said time sequence /$A_i$ (i=1, 2, ..., I) and said reference templates $B_n^m$ (n=1, 2, ..., N), and
   (b) a distance between said time sequence $A_i$ (i=1, 2, ..., I) and said representative reference template $B^m$ obtained by said pre-matching computation means, for each of said j category codes obtained from said prematching means; and
   recognition means for recognizing a category code corresponding to a group which includes a representative reference template $B^m$ and reference templates $B_n^m$ (n=1, 2, ..., N) that are nearest to said time sequence $A_i$ (i=1, 2, ..., I).

2. A pattern recognition system comprising:
   pattern-extracting means for converting an input signal into a time sequence $A_i$ (i=1, 2, ..., I) of characteristic patterns;
   representative reference template memory means for storing representative reference templates $B^m$ (m=1, 2, ..., M) from among multiple reference templates for each category m (m=1, 2, ..., M), said representative reference template having smallest distance among said reference templates of a category to the other reference templates of said category;
   reference template memory means for storing reference templates $B_n^m$ (n=1, 2, ..., N) which are other than said representative reference templates $B^m$ (m=1, 2, ..., M), and have same feature parameters as said representative reference templates;
   pre-matching computation means for computing a matching between said time sequence $A_i$ (i=1, 2, ..., I) of characteristic patterns and said representative reference templates $B^m$ (m=1, 2, ..., M),
   pre-matching means for comparing a smallest one of a plurality of distances between said time sequence $A_i$ (i=1, 2, ..., I) and said representative reference template $B^m$ given as a result of computing by said pre-matching computation means, with a predetermined threshold distance to obtain a comparison result, and when the comparison result is that said smallest distance is smaller than said threshold distance, outputting only a category code corresponding to a representative reference template which gives the smallest distance, and when the comparison result is that said smallest distance is larger than said threshold distance, outputting a smallest j (j$\geq$2) pre-matched distances, which are given by said pre-matched computation means, together with j corresponding category codes;

gate means for outputting said category code as a recognition result when the output of said pre-matching means is ony one category code, and outputting a signal to carry out a matching computation between said reference templates stored in said reference template memory means and said time sequence $A_i$ when said output of said pre-matching means is a pre-matched distance to multiple category codes;

computing means for computing matching said time sequence $A_i$ (i=1, 2, ..., I) of characteristic patterns with only those of said reference templates which correspond to said category codes issued from said pre-matching means, among reference templates stored in said reference template memory means;

averaging means for producing an average of a smallest k distance(s) for each group of:

(a) distances between said time sequence $A_i$ (i=1, 2, ..., I) and said reference templates $B_n^m$ (n=1, 2, ..., N), and (b) a distance between said time sequence $A_i$ (i=1, 2, ..., I) and said representative reference template $B^m$ obtained by said pre-matching computing means, for each category code obtained from said pre-matching means; and recognition means for recognizing a category code corresponding to a group, which consists of a representative reference template $B^m$ and reference templates $B_n^m$ (n=1, 2, ..., N) and is nearest to said time sequence $A_i$ (i=1, 2, ..., I).

3. A pattern recognition system in accordance with claim 1, wherein said pre-matching computation means has same matching computing means as that of said computing means.

4. A pattern recognition system in accordance with claim 2 wherein said pre-matching computation means has same matching computing means as that of said computing means.

5. A method for recognition of patterns, comprising the steps of:

converting an input signal into a time sequence $A_i$ of characteristic patterns;

storing in advance a plurality of reference templates in a memory means, said reference templates arranged by categories, and within each category including a representative reference template which has smaller distances to the others of the reference templates than any others of the reference templates;

pre-matching between said time sequence $A_i$ of characteristic patterns and said representative reference templates;

providing at least one corresponding category code indicative of said categories, and which represent ones of said categories indicated by said pre-matching;

computing a matching between said time sequence $A_i$ of characteristic patterns and at least one reference templates, only from said at least one category as indicated by said corresponding category codes;

producing an average of a smallest distance among the distances: (a) between said time sequence $A_i$ and said reference templates, and (b) between said time sequence $A_i$ and said representative reference template, said averaging being produced for each of said at least one corresponding category codes from said pre-matching step; and recognizing a category code which includes a representative reference template and reference templates nearest to said time sequence.

* * * * *